R. W. DAVIS.
Wheels for Vehicles.
No. 151,360. Patented May 26, 1874.
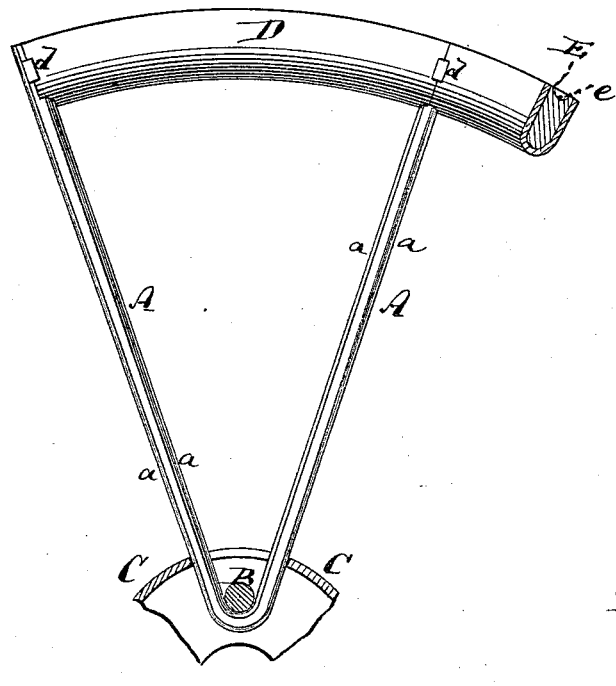
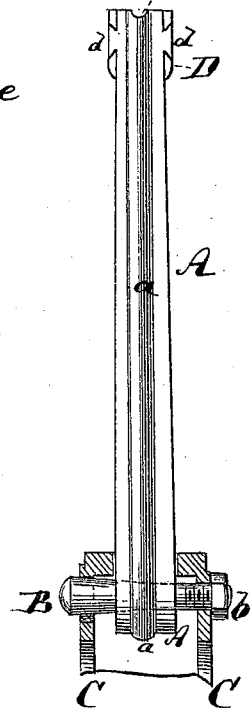
Witnesses.
John Becker
Fred Haynes
R. W. Davis
by his Attorneys
Brown & Allen

UNITED STATES PATENT OFFICE.

ROBERT W. DAVIS, OF BATH, ASSIGNOR OF ONE-HALF HIS RIGHT TO EDWIN ELDRIDGE, OF ELMIRA, NEW YORK.

IMPROVEMENT IN WHEELS FOR VEHICLES.

Specification forming part of Letters Patent No. 151,360, dated May 26, 1874; application filed September 12, 1873.

*To all whom it may concern:*

Be it known that I, ROBERT W. DAVIS, of Bath, in the county of Steuben and State of New York, have invented an Improved Wheel for Vehicles, of which the following is a specification:

Figure 1 is a partial face view, partly in section, of my improved wheel. Fig. 2 is a side view of one of the spokes, showing its connection with a felly and hub. Fig. 3 is an edge view of the felly, showing the ends of the two spokes.

Similar letters of reference indicate corresponding parts in all the figures.

This invention relates to improvements in wagon and carriage wheels of that kind in which the metallic spokes are joined at their inner ends in pairs; and the invention consists, first, in the use of a conical pin, which is fitted through the hub parallel to the axis thereof and passes through the loop that is formed by the two converging and united spokes, and serves, when moved, to draw or slacken the spokes, as may be desired. The invention also consists in forming at the ends of such double spoke projecting tenons that enter recesses in the contiguous ends of the metallic felly-shell employed by me, and serve thereby to retain the said shells at the exact required distance from the center of the hub, and also to prevent their spreading laterally. Finally, my invention consists in forming a groove around the entire felly, which also extends into the outer ends of the spokes, and is adapted for the reception of an inwardly-projecting rib formed on the tire, said groove, when filled with the rib of the tire, preventing the tire from becoming laterally displaced on the wheel.

In the accompanying drawing, the letter A represents a double spoke of metal having its ends extending to the tire, which is not shown, while at the middle it is bent around a pin, B, that is secured in the hub C, the one band or strap, A, thus forming two spokes. This double spoke is made with projecting ribs $a\ a$ at both sides, said ribs extending from the upper or outermost ends of the spoke along the entire length of the same, as is fully indicated in Fig. 2, and also in Fig. 3. By the use of these ribs great strength is imparted to the metallic spoke, and its elasticity at the same time preserved. The pin B, by which the double spoke is held to the hub, is of conical form, as shown in Fig. 2, and is fitted through the two shells of the hub, in the manner indicated. The aperture in that shell in which the conical part of the plug or pin B is contained is of such size that the said pin may be displaced lengthwise or drawn in to a suitable extent, so that either its smaller or its larger part may be brought within the spoke over the bent portion thereof. Thus, by drawing the pin B by means of a nut, $b$, or otherwise, the spokes may be drawn nearer to the axis of the wheel, and the wheel thus be tightened up, while, when the smaller part of the pin B is brought into the spoke the wheel will be slackened or expanded to fit the tire. The felly is made of a metallic shell, D, that embraces a wooden filling, E, as is clearly shown in Fig. 1. It is made in sections to suit the distances between the outer ends of the spokes. Each spoke has at its outer ends projecting tenons $d\ d$ that enter recesses in the ends of the felly-shell sections. The said tenons $d$ are, by preference, of dovetail shape, as shown in Fig. 2, and serve, first, to connect the two adjoining sections of the felly-shell; secondly, to prevent the outward spread of the felly-shell; and thirdly, to prevent the displacement, radially, of the felly on the spokes. The outer periphery of the wooden filling E is made with a groove, $e$, extending clear around the wheel, which groove, inasmuch as the extreme ends of the spokes also extend to the outer edge of the felly, is also formed in such outer ends of the spokes, as is shown in Figs. 2 and 3. The tire, which is to be placed upon a wheel of this construction, is provided on its inner circumference with a projecting rib of a size to fit the groove $e$, and will thereby be held in position, and prevented from lateral displacement. It will be noticed that the spoke A, of the construction shown, and when applied to the felly, as shown, is of equal cross-section throughout, and has its full strength therefor at every part of its length, which is a great advantage over the ordinary spokes, which are weakened at certain points, and therefore more liable to break.

I claim as my invention and desire to secure by Letters Patent—

1. The combination of the conical movable pin B placed parallel to the axis of the wheel, with the double metal spoke A A, and with the shells of the wheel-hub C, through which the pin B is inserted, substantially as shown and described.

2. The double spoke A, formed with laterally-projecting tenons $d$ at its outer ends to fit corresponding recesses in the contiguous ends of the felly-sections, as set forth.

3. The wheel-felly E, combined with the spokes A, which extend to the outer circumference of the felly, and which, as well as the felly, are provided with a groove, $e$, that extends around the wheel, substantially as and for the purpose described.

R. W. DAVIS.

Witnesses:
   HENRY T. BROWN,
   MICHAEL RYAN.